(12) United States Patent
Brüggemann et al.

(10) Patent No.: US 9,145,175 B2
(45) Date of Patent: Sep. 29, 2015

(54) VEHICLE BODY

(71) Applicant: VOLKSWAGEN AG, Wolfsburg (DE)

(72) Inventors: Carsten Brüggemann, Braunschweig (DE); Thomas Dobberan, Gifhorn (DE); Friedrich Drenckhahn, Wasbüttel (DE); Stefan Weber, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/448,241

(22) Filed: Jul. 31, 2014

(65) Prior Publication Data

US 2015/0042125 A1 Feb. 12, 2015

(30) Foreign Application Priority Data

Aug. 9, 2013 (DE) .......................... 10 2013 215 793

(51) Int. Cl.
*B62D 25/00* (2006.01)
*B62D 27/02* (2006.01)
*B62D 25/02* (2006.01)
*B62D 25/04* (2006.01)

(52) U.S. Cl.
CPC ............ *B62D 27/023* (2013.01); *B62D 25/025* (2013.01); *B62D 25/04* (2013.01)

(58) Field of Classification Search
CPC ..... B62D 2/023; B62D 25/025; B62D 25/047
USPC .................................. 296/187.12, 193.06, 209
See application file for complete search history.

(56) References Cited

U.S. PATENT DOCUMENTS

| 8,608,232 B2* | 12/2013 | Engertsberger et al. . 296/187.12 |
| 2011/0095567 A1 | 4/2011 | Ishigame et al. |
| 2013/0187406 A1* | 7/2013 | Torii ........................ 296/187.12 |

FOREIGN PATENT DOCUMENTS

DE 10 2005 044 820 A1 4/2007

* cited by examiner

*Primary Examiner* — Joseph D Pape
(74) *Attorney, Agent, or Firm* — Pearl Cohen Zedek Latzer Baratz LLP

(57) ABSTRACT

A vehicle body includes a bottom sillboard, the inner and outer profile parts of which are joined together, as viewed in the vehicle transverse direction, at upper and lower flange connections, to which bottom sillboard a pillar base of a body pillar element is attached, which, in the event of a side collision is supported with a first support profile against the upper flange connection of the bottom sillboard, and with a second support profile against a sillboard outer wall between the two flange connections. According to the invention, a force transmission element is provided in the hollow space of the bottom sillboard. In the event of a side collision, the force transmission element provides an additional force path between the second support profile and a sillboard inner wall.

8 Claims, 5 Drawing Sheets

Section I-I

VEHICLE BODY

CROSS REFERENCE TO RELATED APPLICATIONS

This Application claims priority of German Patent Application No. DE 10 2013 215 793.2, filed Aug. 9, 2013, which is hereby incorporated by reference.

FIELD OF THE INVENTION

The present invention relates to a vehicle body.

The B-pillar of the vehicle body extends essentially in the vertical direction between the roof longitudinal beam and the bottom sillboard of the motor vehicle. In standard practice, the B-pillar is a hollow support member, into which an additional reinforcing element is integrated in order to increase a lateral impact resistance in the event of a side collision. The reinforcing element counteracts a crash-related deformation of the B-pillar into the vehicle interior.

BACKGROUND OF THE INVENTION

A generic vehicle body is known from US 2011/0095567 A1. This body includes a bottom sillboard, the inner and outer profile sections of which, as viewed in the vehicle transverse direction, are joined together at upper and lower flange connections. Attached to the bottom sillboard is a pillar base of a body pillar element (i.e., the aforementioned reinforcing element). In the case of a side collision, the pillar base is supported against the bottom sillboard. In the event of such a side collision, the upper flange connection in particular of the bottom sillboard is severely stressed to the point that the risk of a material failure exists, which is disadvantageous in terms of the deformation behavior of the vehicle body.

Another vehicle body having a bottom sillboard, which also supports a body pillar element, is known from DE 10 2005 044 820 A1. The bottom sillboard also includes a corrugated sheet metal plate with which the bottom sillboard is reinforced in the vehicle transverse direction. This ensures that the transverse rigidity of the bottom sillboard is increased in the event of a side collision.

SUMMARY OF THE INVENTION

The object of the present invention is to provide a vehicle body in which a favorable deformation behavior is provided in a simple manner for the vehicle occupant in the event of a side collision.

The object is achieved by the features of the present invention as described below.

The present invention is based on the fact that in the event of a side collision, the body pillar element is so far supported essentially only on the upper flange connection of the bottom sillboard, as a result of which only one single load path exists for transmitting the side collision forces into the bottom sillboard. Due to the correspondingly high force transmission, the risk exists that the upper flange connection of the bottom sillboard will tear, resulting in an adverse deformation behavior of the vehicle body.

Against this background, the pillar base is also provided with a further support profile which, in the event of a side collision, is supported against a sillboard outer wall between the two sillboard flange connections. Also provided in the hollow space of the bottom sillboard is a force transmission element, which is situated inwardly, aligned behind the additional second support profile of the pillar base in the vehicle transverse direction. Hence, this provides an additional load path in the event of a side collision, via which the collision forces may be transmitted, starting from the second support profile via the force transmission element to the sillboard inner wall.

The body pillar element (i.e., the reinforcing element) is designed with a material strength that prevents the body pillar element from tearing apart in the event of a side collision. Thus, when reducing the material strength of the body pillar element, it is also necessary to reduce the collision load acting on the body pillar element. This may be preferably achieved by a correspondingly soft (i.e., flexible) support of the pillar base on the bottom sillboard. Thus, in the event of a side collision, the bottom sillboard is not rigid, but is subject instead to a torsional movement about a sillboard longitudinal axis, in which the pillar base of the body pillar element supported on the sillboard is displaced inwardly in the vehicle transverse direction. In order not to impair the aforementioned torsional movement of the bottom sillboard, it is advantageous if the force transmission element only partially fills the hollow space cross section of the bottom sillboard, rather than completely. In this way, the torsional rigidity of the bottom sillboard is held to a minimum. Thus, the second support profile of the pillar base particularly advantageously covers the force transmission element in the vehicle transverse direction, specifically, in such a way that the force transmission element does not project in the vehicle vertical direction. In this case, the load path provided by the force transmission element may, as viewed in the vehicle vertical direction, be situated above the sillboard longitudinal axis, whereas below this axis the sillboard hollow space remains open.

In order to function flawlessly, the force transmission element must be designed with an extremely high degree of transverse rigidity. Against this background, the force transmission element may preferably be a corrugated bulkhead, the corrugated apex lines and corrugated base lines of which extend in the vehicle transverse direction. As a favorable assembly technique, the corrugated bulkhead may be affixed, using mounting brackets, for example, solely to the outer profile part of the bottom sillboard, e.g., by welding. In contrast, the corrugated bulkhead may also be in loose abutment with the inner profile part of the bottom sillboard or spaced slightly apart therefrom. In such a configuration, the standard assembly procedure of the vehicle body is not hampered by the additional force transmission element provided on the outer sillboard profile part.

The corrugated bulkhead serves to transmit additional load between the pillar base and the inner profile part of the bottom sillboard. Thus, unlike conventional bulkheads, it is not to be considered a deformation element. Optimally, the corrugated bulkhead is not deformed at all in the event of a side collision, so that it transmits a maximum of collision forces.

In contrast to conventional corrugated bulkheads, the corrugated bulkhead according to the present invention is rotated by 90° in the bottom sillboard. This means that a continuous, "linear" force transmission to the inner profile part of the bottom sillboard takes place. By shaping the geometry in the form of corrugations, the corrugated bulkhead stabilizes itself. As a result, the forces are very high before reaching the point of instability. The corrugated bulkhead according to the present invention is therefore able to transmit high forces with no appreciable deformation.

For a structurally rigid connection, the pillar base of the body pillar element may have an angular profile, specifically, including a bearing flank attachable to the upper side of the bottom sillboard and an outer flank attachable to the outer wall of the bottom sillboard. The outer flank of the pillar base may act as the aforementioned second support profile in the event of a side collision.

The angular profile of the pillar base may transition upwardly in the vehicle vertical direction to a U-profile, specifically, with an outer bottom wall in the vehicle transverse direction and with connecting side flanks projecting inwardly in the vehicle transverse direction. The free marginal edges of these side flanks may be angled with edge flanges, which are supported in the assembled state against the upper flange connection of the bottom sillboard. Similarly, the edge flanges of the pillar base serve here as the first support profile within the meaning of the present invention.

Thus, according to the present invention, the load of the upper flange connection of the bottom sillboard is reduced in the event of a side collision, specifically, due to the additional load path, which, in the event of a side collision, bridges the hollow space of the bottom sillboard between the sillboard outer wall and the sillboard inner wall.

The advantageous embodiments and/or refinements of the present invention explained above and/or expressed in the subclaims may—except, for example, in those cases of clear dependencies or incompatible alternatives—be used individually or else with one another in arbitrary combination.

BRIEF DESCRIPTION OF THE DRAWINGS

The present invention and its advantageous embodiments and/or refinements and their advantages are explained in greater detail below with reference to the drawings.

DETAILED DESCRIPTION OF THE DRAWINGS

Figure 1:
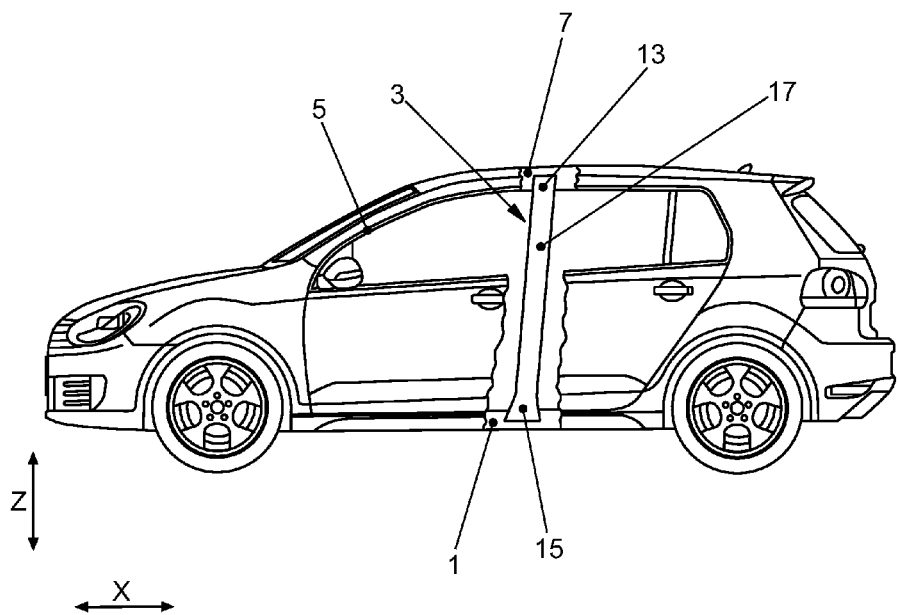
FIG. 1 shows a side view of a partial section of a vehicle.

FIG. 1 shows a motor vehicle, the body in white which includes a lower main chassis beam at a side wall assembly, which transitions in the area of the passenger compartment into a lateral bottom sillboard 1. The B-pillar 3 of the assembly depicted is situated in the driving direction behind an A-pillar 5 and connects bottom sillboard 1 to a roof longitudinal beam 7 of a roof frame of the vehicle body in vertical direction z.

Figure 2:
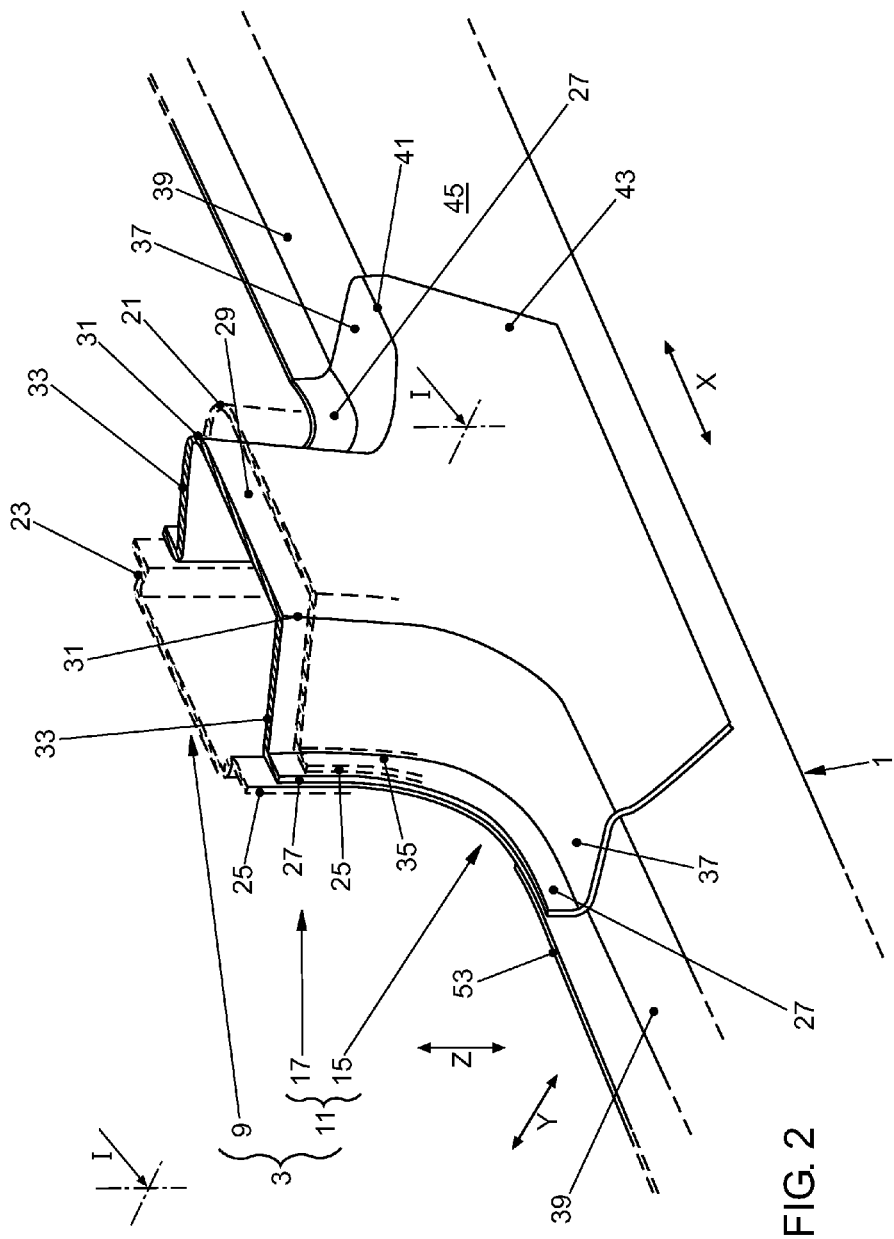
FIG. 2 shows a detailed view of the transition of a B-pillar to the bottom sillboard of the vehicle body.

B-pillar 3 serves on the one hand to reinforce the side of the body and on the other hand to accommodate add-on components, such as a belt retractor or the like. Here, the B-pillar is designed as a hollow support member 9 (indicated by broken lines only in FIG. 2), into which a reinforcing sheet metal part 11 highlighted with solid lines in FIG. 2 is integrated. With the aid of reinforcing sheet metal part 11 integrated into hollow support member 9, the lateral impact momentum resistance of B-pillar 3 is increased in the event of a side collision.

According to FIG. 1, reinforcing sheet metal part 11 includes a head section 13 structurally rigidly connected to roof longitudinal beam 7, a pillar base 15 connected to bottom sillboard 1, and a middle pillar section 17 in between, extending in vertical direction z.

FIG. 2 shows a detailed view of the transition of pillar section 17 into pillar base 15 of reinforcing sheet metal part 11, and the attachment of pillar base 15 to bottom sillboard 1. According to FIG. 2, hollow support member 9 of B-pillar 3 is constructed of a U-profiled outer sheet metal plate 21 depicted with broken lines only in FIG. 2, and of an inner sheet metal plate 23 also indicated by broken lines. The fastening flanges 25 of inner and outer sheet metal plates 21, 23 are optionally welded to one another with an edge flange 27 of reinforcing sheet metal part 11 layered in between (not further shown in FIG. 2).

According to FIG. 2, reinforcing sheet metal part 11 in middle pillar section 17 has an approximately U-shaped profile, specifically, with an outer bottom wall 29 in vehicle transverse direction y, as well as side flanks 33, which project inward in vehicle transverse direction y at transition edges 31. Both side flanks 33 are angled with aforementioned edge flanges 27 at free marginal edges 35. U-profiled pillar section 17 in this case is adapted approximately to the contour of likewise U-shaped outer sheet metal plate 21.

Pillar base 15 shown in FIG. 2 is designed with an angular profile, which is attached with horizontal upper bearing flanks 37 to upper side 39 of bottom sillboard 1. Bearing flanks 37 transition at angular profiled edges 41 into the vertical, flat outer flank 43, which is attached to an outer wall 45 of bottom sillboard 1 pointing outward in vehicle transverse direction y. In this case, bottom wall 29 of U-profiled pillar section 17 transitions approximately flush into outer flank 43 of the angular profile, whereas side flanks 33 of pillar section 17 transition into bearing flanks 37 expanded to the front and to the rear in vehicle longitudinal direction x.

Figure 4:
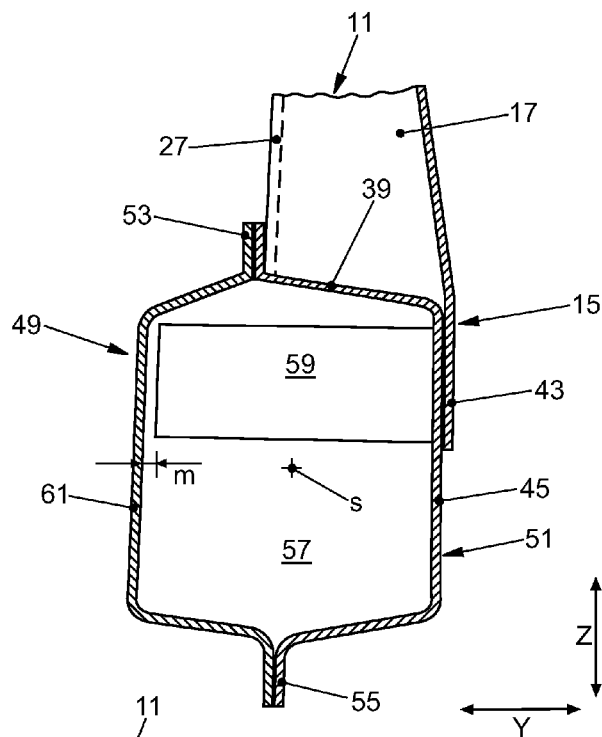
FIG. 4 shows a sectional representation along the section plane I-I from FIG. 2.

As is also apparent from FIG. 4, bottom sillboard 1 is a hollow support member, which is constructed, as viewed in vehicle transverse direction y, of an inner profile part 49 and an outer profile part 51. Both profile parts 49, 51 are each U-profile parts facing one another, which are joined together at upper and lower flange connections 53, 55.

Also situated within hollow space 57 of bottom sillboard 1 is a corrugated bulkhead 59, which acts as a force transmission element in the side collision described below. Corrugated bulkhead 59 is positioned, as viewed in vehicle transverse direction y, inwardly flush behind outer flank 43 of pillar base 15, specifically, in such a way that outer flank 43, as viewed in vehicle transverse direction y, completely covers corrugated bulkhead 59, i.e., with no downward projection of corrugated bulkhead 59 in vehicle vertical direction z.

Figure 3:
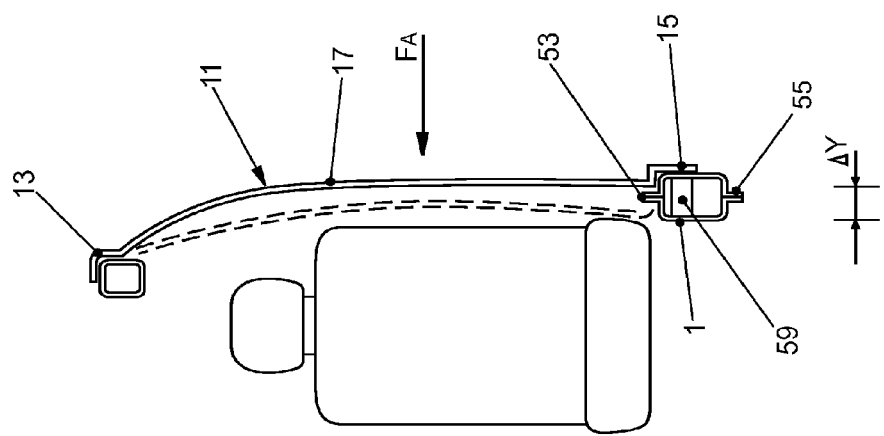
FIG. 3 shows a schematic diagram illustrating the deformation progression during a side crash.

The deformation behavior of B-pillar 3 according to the present invention in the event of a side collision is illustrated with reference to FIG. 3. For reasons of clarity, only reinforcing sheet metal part 11 of B-pillar 3 is indicated in FIG. 3, whereas its hollow support member 9 is not plotted. Accordingly, a deformation is initiated via a deformation path Δy when reinforcing sheet metal part 11 is impacted by a side collision force $F_A$ [in] the lower area of pillar section 17 directly on bottom sillboard 1. In this way, the lower area of side section 17 is displaced inwardly in a pivoting movement about deformation path Δy. In this case, the pivot point is formed by the structurally rigid connection at roof longitudinal beam 7. Thus, the deformation of reinforcing sheet metal part 11 is restricted to just the pillar base 15 situated below the indicated vehicle seat.

Figure 5:
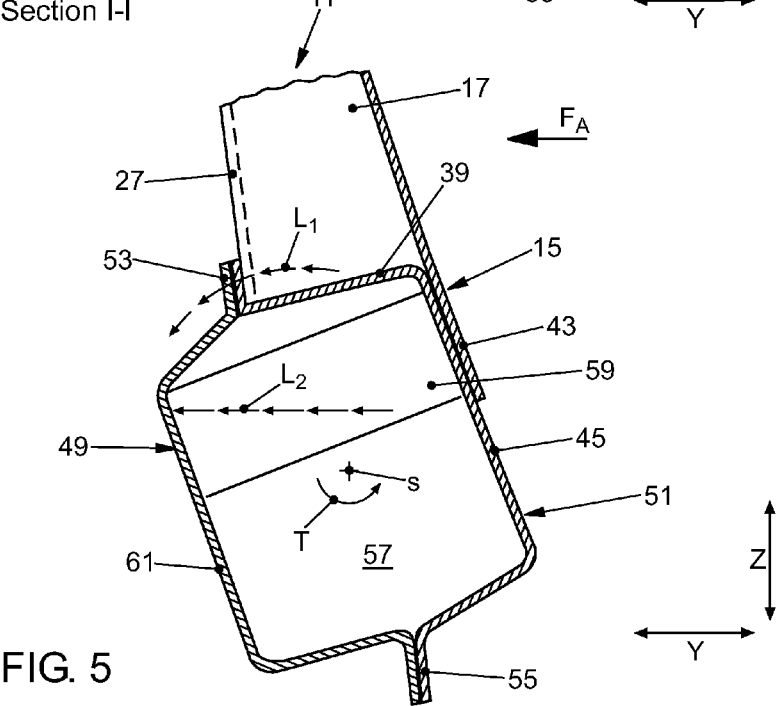
FIG. 5 shows a view corresponding to FIG. 4 in the event of a side collision.

In the side collision also depicted in FIG. 5, aforementioned edge flanges 27 of reinforcing element 11 act as a first support profile of pillar base 15, which is supported against upper flange connection 53 of bottom sillboard 1 to form a first load path $L_1$ (FIG. 5). Outer flank 43 of pillar base 15 acts in this connection as an additional second support profile of pillar base 15. In the event of a collision, namely, a part of the collision forces is transmitted via outer flank 43 into corrugated bulkhead 59, which provides a parallel, additional load path $L_2$. Integrated in second load path $L_2$ are, in addition, sillboard outer wall 45 and sillboard inner wall 61, into which the collision forces are transmitted. In this way, the load and therefore the risk of a material failure in upper flange connection 53 are reduced.

As previously mentioned, corrugated bulkhead 59 is positioned approximately in the upper half of bottom sillboard hollow space 57. As a result, load path $L_2$, as viewed in vehicle vertical direction z, is located above a sillboard longitudinal axis S. The collision forces are transmitted via the first support profile (i.e., edge flange 27) and the second support profile (i.e., outer flank 43) in such a way that a torsional movement T (FIG. 5) of bottom sillboard 1 takes place about a sillboard longitudinal axis S, specifically, while pillar base 15 is simultaneously displaced inwardly about a transverse offset in vehicle transverse direction y.

Figure 6:
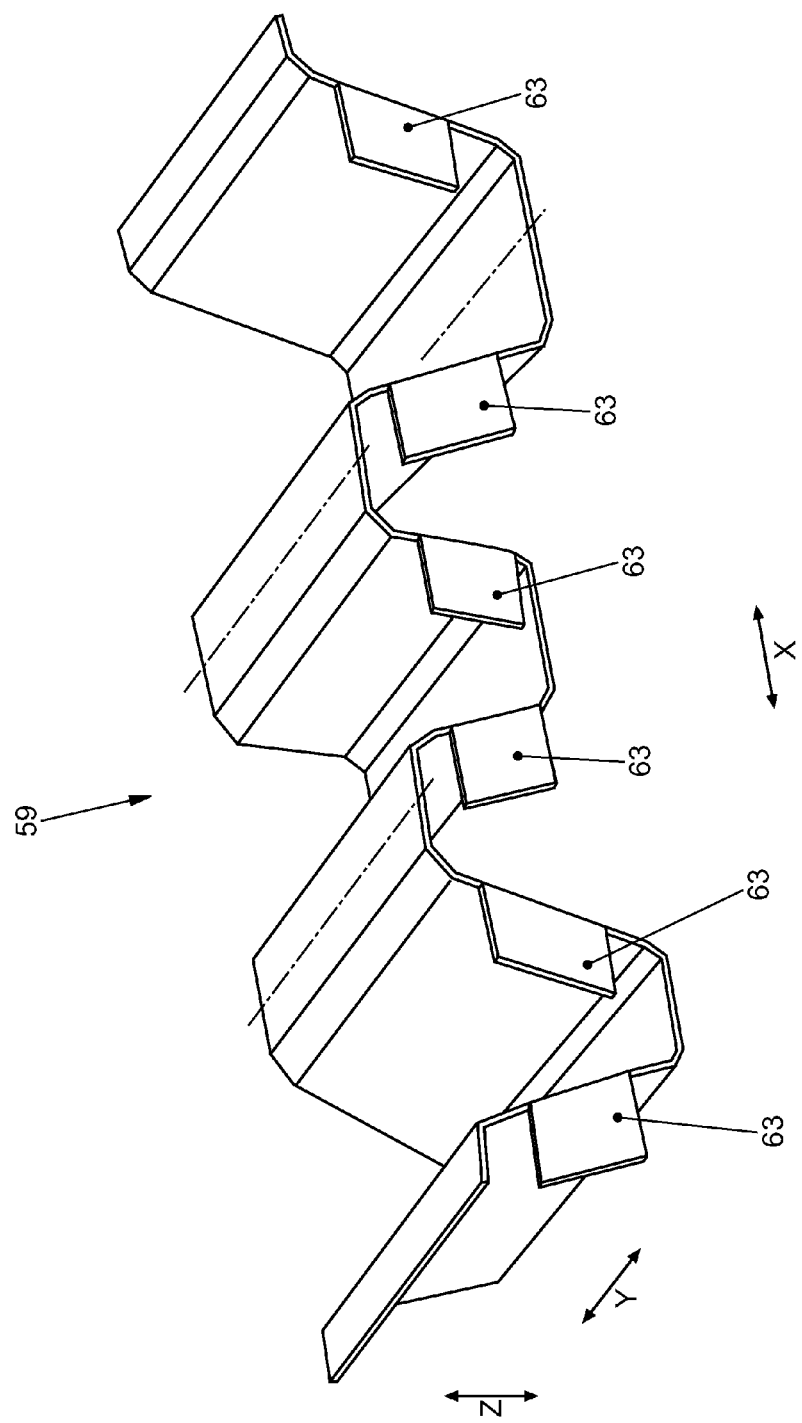
FIG. 6 shows a force transmission element implemented as a corrugated bulkhead.

FIG. 6 shows a stand-alone perspective view of corrugated bulkhead 59. Accordingly, the side of corrugated bulkhead 59 facing outer profile part 51 includes mounting brackets 63, which are spot welded to outer profile part 51. In contrast, the end of corrugated bulkhead 59 facing inner profile part 49 is spaced slightly apart by an installation gap m (FIG. 4) from inner profile part 49. To ensure a sufficiently high transverse rigidity of corrugated bulkhead 59, the corrugation apex lines and corrugation base lines indicated by chain-dotted lines in FIG. 5 extend in parallel alignment along vehicle transverse direction y.

What is claimed is:

1. A vehicle body comprising:
    a bottom sillboard having a hollow space, a sillboard longitudinal axis (S), an inner profile part and an outer profile part, each profile part having an upper flange connection and a lower flange connection, wherein said inner profile part and said outer profile part are joined together by said upper and lower flange connections as viewed in a vehicle vertical direction (z);
    a body pillar element having a pillar base attached to the bottom sillboard, said pillar base having a first support profile and a second support profile,
    wherein, in the event of a side collision ($F_A$), said pillar base is supported by the first support profile against the upper flange connection of the bottom sillboard and by the second support profile against a sillboard outer wall between the upper and lower flange connections; and
    a force transmission element arranged in a first portion of the hollow space of the bottom sillboard above the sillboard longitudinal axis (S) such that a second portion of the hollow space below the axis (S) remains hollow,
    wherein, in the event of a side collision ($F_A$), the force transmission element provides a force path ($L_2$) between the second support profile and a sillboard inner wall;
    wherein the bottom sillboard is configured to flex in such a way that, in the event of a side collision ($F_A$), a torsion (T) of the bottom sillboard occurs about the sillboard longitudinal axis (S) under an inward displacement of the pillar base in a vehicle transverse direction (y); and
    wherein the force path ($L_2$) provided by the force transmission element is arranged above the sillboard axis (S) as viewed in the vehicle vertical direction (z).

2. The vehicle body as recited in claim 1, wherein the force transmission element is arranged in a vehicle transverse direction (y) and aligned inwardly flush behind the second support profile of the pillar base.

3. The vehicle body as recited in claim 1, wherein, as viewed in a vehicle transverse direction (y), the second support profile of the pillar base covers the force transmission element such that no projection of the force transmission element is visible in the vehicle vertical direction (z).

4. The vehicle body as recited in claim 1, wherein the force transmission element has a corrugated profile with corrugation apex lines and corrugated base lines extending in a vehicle transverse direction (y).

5. The vehicle body as recited in claim 1, wherein the force transmission element is affixed to the outer profile part of the bottom sillboard, and the force transmission element abuts with the inner profile part of the bottom sillboard.

6. The vehicle body as recited in claim 1,
    wherein the pillar base has an angular profile comprising an outer bearing flank configured to attach to an upper side of the bottom sillboard, and an outer flank configured to attach to the sillboard outer wall, wherein the outer flank acts as the second support profile in the event of a side collision ($F_A$).

7. The vehicle body as recited in claim 1, wherein the pillar base has a U-shaped profile, including an outer bottom wall in the vehicle transverse direction (y) and side flanks projecting inwardly in the vehicle transverse direction (y), said side flanks having free marginal edges having angled edge flanges, wherein the edge flanges form the first support profile of the pillar base.

8. The vehicle body as recited in claim 1, wherein the force transmission element is affixed to the outer profile part of the bottom sillboard, and the force transmission element is spaced apart from the inner profile part of the bottom sillboard.

* * * * *